(12) United States Patent
Wakefield, II et al.

(10) Patent No.: US 6,989,642 B2
(45) Date of Patent: Jan. 24, 2006

(54) METHOD AND APPARATUS FOR EMBEDDING MOTOR ERROR PARAMETER DATA IN A DRIVE MOTOR OF A POWER DRIVEN WHEELCHAIR

(75) Inventors: Theodore D. Wakefield, II, Vermillion, OH (US); Thomas Strothmann, Wallenhorst (DE); Neal Joseph Curran, Lakewood, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 10/686,840

(22) Filed: Oct. 16, 2003

(65) Prior Publication Data

US 2005/0082995 A1 Apr. 21, 2005

(51) Int. Cl.
*B60K 1/00* (2006.01)
*H02P 5/46* (2006.01)

(52) U.S. Cl. .................. 318/139; 388/903; 318/41; 318/491

(58) Field of Classification Search .............. 318/139, 318/567, 568.1, 599, 41, 53, 66, 68, 77, 491; 388/902, 903, 907.5
See application file for complete search history.

(56) References Cited

U.S. PATENT DOCUMENTS

| | | | |
|---|---|---|---|
| 5,033,000 A | * | 7/1991 | Littlejohn et al. ............ 701/36 |
| 5,473,229 A | | 12/1995 | Archer et al. |
| 5,726,541 A | * | 3/1998 | Glenn et al. .................. 318/16 |
| 6,059,060 A | * | 5/2000 | Kanno et al. ............. 180/65.8 |
| 6,211,639 B1 | * | 4/2001 | Meister et al. ........... 318/568.2 |
| 6,230,831 B1 | * | 5/2001 | Ogata et al. ............... 180/65.1 |

FOREIGN PATENT DOCUMENTS

| | | |
|---|---|---|
| EP | 1093219 A2 | 4/2001 |
| EP | 1178498 A2 | 2/2002 |

\* cited by examiner

*Primary Examiner*—Bentsu Ro
(74) *Attorney, Agent, or Firm*—Calfee, Halter & Griswold LLP

(57) ABSTRACT

A drive motor assembly for a power driven wheelchair comprises: a stator housing for containing field coils of a stator of the motor assembly; at least one sensor disposed in the stator housing for sensing rotation of the motor; a memory storing motor error parameter data including data of errors of the at least one sensor, the memory being embedded in the stator housing; and a connection for accessing the error parameter data of the memory from the stator housing. The motor error parameter data may be accessed from the embedded memory of the drive motor by a programmed motor controller for use in controlling the drive motor. Also, the motor error parameter data may be embedded in the drive motor by the steps of: controlling the motor through at least one predetermined drive pattern; sensing motor rotation during the drive pattern and generating signals representative thereof; deriving error parameter data of the drive motor from the generated signals; programming a memory with the derived error parameter data; and embedding the memory in the drive motor.

23 Claims, 6 Drawing Sheets

(BACKGROUND)

(BACKGROUND)

METHOD AND APPARATUS FOR EMBEDDING MOTOR ERROR PARAMETER DATA IN A DRIVE MOTOR OF A POWER DRIVEN WHEELCHAIR

BACKGROUND OF THE INVENTION

The present invention is directed to the field of power driven wheelchairs, in general, and more particularly, to a method and apparatus for embedding motor error parameter data in a drive motor of a power driven wheelchair.

Power driven wheelchairs which may be of the type manufactured by Invacare Corporation of Elyria, Ohio, for example, generally include right and left side drive wheels driven by a motor controller via respectively corresponding right and left side drive motors, all of which being disposed on the wheelchair. An exemplary illustration of such a motor drive arrangement is shown in the schematic of FIG. 1. Referring to FIG. 1, a motor drive controller 10 which may be an Invacare MK IV™ controller, for example, controls drive motors 12 and 14 which are mechanically linked respectively to the right side and left side drive wheels of the wheelchair. A user interface 16 which may include a joystick 18 and selection switches (not shown) operable by a user is also disposed on the wheelchair in a convenient location to the user. The user interface 16 is generally interfaced to the controller 10 over a two wire serial coupling 20 to permit the user to select a drive program appropriate for operating the wheelchair in its environment and to adjust the direction and speed of the wheelchair within the selected drive program. The controller 10 may be programmed with a plurality of drive programs, each suited for a particular operating environment.

The motor controller 10 is generally powered by a battery source 22, which may be 24 volts, for example, also disposed on the wheelchair. The drive motors 12 and 14 may be of the permanent magnet type like a gearless, brushless AC motor, for example. The controller 10 may include a microcontroller interfaced and responsive to the user interface 16 to control drive signals 24 and 26 to motors 12 and 14, respectively, via a power switching arrangement configured in accordance with the motor type being driven. The power switching arrangement may be powered by the 24V battery 22. Thus, as the user adjusts the speed and direction of the wheelchair via the joystick of interface 16, appropriate drive signals 24 and 26 are controlled by controller 10 to drive the motors 12 and 14 accordingly. Controller 10 generally controls motor speed to the user setting in a closed loop manner.

Actual speed of each motor 12 and 14 is derived from signals 28 and 30 respectively sensed therefrom. For example, for AC drive motors, a Hall Effect sensor combination may be disposed at the motor for sensing and generating signals 28 and 30 representative of angular position which are read by the controller 10. The controller 10 may derive motor speed from the sensor signals 28 and 30 based on a change in angular position, and use the derived motor speed as the actual speed feedback signal for the closed loop speed control of the motor.

For safety purposes, it is preferred that the motors of the wheelchair drive the corresponding wheels of the wheel chair in a smooth fashion. To achieve this smooth motor drive, the rotor and stator of the motor should be manufactured to precise tolerances. In other words, there should be a precise relationship between the magnets positioned uniformly around the rotor assembly and the field coils (normally 3-phase) disposed about the stator assembly so that when the magnetic fields of the stator are energized and caused to rotate in phase, they force the magnets of the rotor to follow in a smooth and uniform manner, i.e. without jerky or interrupted movement. However, mounting of the rotor and stator components in a precise orientation to each other may not always be accomplished. While the motor components may be within their desired manufacturing tolerance, the orientation of such motor components during assembly of one motor to another may not be of the exact same dimensions which leads to variability of component orientation.

In addition, as noted above, closed loop motor speed control of the wheelchair utilizes a motor speed feedback signal generally derived from a set of sensors disposed within the motor assembly for providing signals commensurate with the angular position of the rotor with respect to the stator. However, one set of sensors may measure angular position of the motor slightly different from another set. Thus, the sensitivity of sensor measurements becomes a factor in driving the motor smoothly. Accordingly, each motor assembly will have its own set of error parameters. To achieve the smooth motor drive in present powered wheelchairs, the motor controller determines the error parameters of each motor assembly, generally through a calibration process, and automatically compensates for these error parameters in a motor control algorithm of the controller 10.

To better understand the present calibration procedure, reference is made to FIG. 1 and the block diagram schematic of an exemplary closed loop motor controller depicted in FIG. 2. Controller 10 may include a microcontroller 40 (shown within dashed lines) including a microprocessor programmed with operational algorithms for controlling the AC GB drive motor 12, 14, and an analog-to-digital converter (A/D) 42. The motor 12, 14 may be a three phase motor of the type in which the three field coils thereof are wye connected as shown. Each field coil is driven by a corresponding drive amplifier 44, 46 and 48 powered by the voltage of battery 22. As noted above, the angular position of the rotor may be measured by two Hall Effect sensors 50 and 52 in conjunction with a ring magnet which generate in response to movement of the rotor near sinusoidal signals which are 90° apart (i.e. sine and cosine signals) representative of the angular position of the rotor. The generated signals from sensors 50 and 52 are provided to inputs of the A/D 42 over signal lines 54 and 56, respectively. The A/D 42 digitizes the sensor signals at a sampling rate on the order of 100 Hz, for example.

The microprocessor of the microcontroller 40 is programmed with control algorithms functionally depicted in FIG. 2 by blocks. For example, block 58 performs the function of receiving the digitized sensor signals and converting them into an angular position and motor speed which is conveyed to a summation block 60. A speed demand signal may be input to the controller from the user interface 16, for example, and applied to another input of the summation block 60 which subtracts the motor speed signal from the speed demand signal to arrive at an error signal $\epsilon$. A motor control algorithm 62 is governed by the speed error to cause each of three pulse width modulator algorithms 64, 66, and 68 to generate a pulsed width modulated signal to a corresponding amplifier 44, 46 and 48, respectively. The amplifiers 44, 46 and 48 in turn generate voltage signals V1, V2 and V3, respectively, which cause the corresponding field coils of the drive motor 12, 14 to rotate a magnetic field in proper phase about the stator to force the rotor to follow.

Currently, after the wheelchair is assembled during manufacture, the aforementioned motor error parameters are determined individually for each drive motor of the wheelchair by the calibration process which entails lifting the wheels of the wheelchair off the ground. The calibration procedure may be initiated through a remote programmer 70 which may be electrically coupled to a port of the microcontroller 40 of controller 10 via signal lines 72, for example. The calibration procedure may be menu selected via an interactive display 74 of the programmer 70 by operation of input pushbuttons 76 thereof. Once selected, the programmer 70 sends a signal over lines 72 to the microcontroller 40 to execute a calibration algorithm 80 programmed therein.

During execution of the calibration algorithm 80, the summation block 60 is functionally disconnected and the motor is automatically driven open loop via motor control algorithm 62 by an error signal 82 generated by the algorithm 80 in accordance with predetermined drive patterns. During the calibration procedure, a feedback speed signal 84 is monitored by the calibration algorithm 80 to determine certain motor error parameters, such as angular error in the orientation between the sensors 50 and 52 (should be precisely 90°), the amplitude variation of each sensor to the magnetic field, and the distortion parameter for each sensor which is related to the deviation of the sensor signal from a sine wave, for example.

Once the motor error parameters are determined for each motor 12 and 14 of the wheelchair, data representative thereof are stored in a non-volatile memory 86, which may be an electrically erasable programmable read only memory (EEPROM), for example. Thereafter, each time the motor control algorithm 62 is executed, it uses the motor error parameter data stored in the EEPROM 86 for a smooth control of the drive motors 12 and 14. However, the stored motor error parameter data are unique to the present motors and sensors of the wheelchair, and the particular assembly thereof. Thus, each time a service problem is encountered in the field involving replacement of a motor assembly unit, the calibration procedure has to be repeated which includes maintaining the wheels of the wheelchair off the ground through use of blocks or other onerous techniques.

Understandably, having to repeat the calibration procedure in the field to re-determine the motor error parameters each time a motor assembly is replaced is a very timely and costly operation which needs improvement. The present invention is intended to address the timeliness and cost of the current motor error parameter setting technique and provide a method and apparatus which overcomes the drawbacks thereof.

SUMMARY OF THE INVENTION

In accordance with one aspect of the present invention, a drive motor assembly for a power driven wheelchair comprises: a stator housing for containing field coils of a stator of the motor assembly; at least one sensor disposed in the stator housing for sensing rotation of the motor; a memory storing motor error parameter data including data of errors of the at least one sensor, the memory being embedded in the stator housing; and means for accessing the error parameter data of the memory from the stator housing.

In accordance with another aspect of the present invention, apparatus for accessing motor error parameter data from a drive motor of a wheelchair comprises: a memory embedded in the drive motor, the memory storing motor error parameter data; and a programmed motor controller for controlling the drive motor, the motor controller operative to access the motor error parameter data from the embedded memory for use in controlling the drive motor.

In accordance with yet another aspect of the present invention, a method of embedding motor error parameter data in a drive motor of a wheelchair comprises the steps of: controlling the motor through at least one predetermined drive pattern; sensing motor rotation during the drive pattern and generating signals representative thereof; deriving error parameter data of the drive motor from the generated signals; and programming a memory with the derived error parameter data; and embedding the memory in the drive motor.

DETAILED DESCRIPTION OF THE INVENTION

Figure 3:
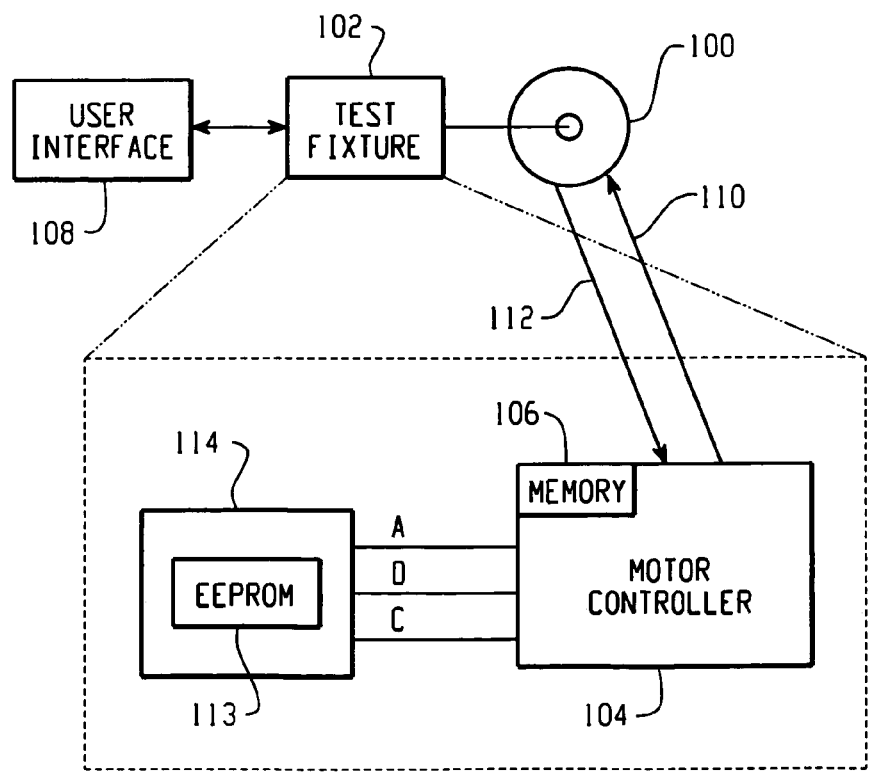
FIG. 3 is a block diagram illustration of a drive motor attached to a test fixture for embedding motor error parameter data in the drive motor in accordance with one aspect of the present invention.

In accordance with the present invention, once a drive motor 100 has been assembled, it may be coupled to a test fixture 102 as shown in FIG. 3 so that the rotor thereof is free to rotate with respect to the stator when driven. The test fixture 102 may include a motor controller 104 which may be similar in design as the motor controller described in connection with FIG. 2. The motor controller 104 may include memory 106 for storing the operational programs of the control and calibration algorithms as described in the embodiment of FIG. 2 for controlling the motor under test 100. Tests may be performed on the assembled motor 100 through an interactive user interface 108 coupled to the test fixture 102. The user interface may be a personal computer (PC) with a conventional keyboard and display, or a manual control panel with pushbuttons and indicators, for example. In any event, once the motor 100 is attached to the test fixture 102 and free to rotate, an operator may control the test fixture 102 via the user interface 108 to initiate a calibration procedure similar to the calibration procedure described for the embodiment of FIG. 2.

During the calibration procedure, a calibration algorithm will be executed in the motor controller 104 to drive the motor 100 through a number of predetermined drive or speed patterns using drive signals over lines 110. Concurrently, the motor controller 104 will read the angular position signals over lines 112 from the Hall Effect sensors 50 and 52 built into the motor assembly as described in FIG. 2. As part of the calibration algorithm, the motor controller 104 will determine certain motor error parameters which are unique to the motor under test 100 and store data representative thereof in memory 106, for example. The motor error parameters, may include, but not be limited to, angular error in the orientation between the sensors 50 and 52 (should be precisely 90°), the amplitude variation of each sensor to the magnetic field, and the distortion parameter for each sensor which is related to the deviation of the sensor signal from a sine wave, for example.

Once all of the motor error parameters are determined, the operator may insert a non-volatile memory 113, like a EEPROM, for example, into a pluggable unit 114 which may be coupled to the motor controller 104 over address (A), data (D) and control (C) lines. The EEPROM 113 may be of the type manufactured by Microchip under the part no. 24AA01, for example, which is an integrated circuit (IC) disposed within an 8 pin package. The pluggable unit 114 may be a pin pluggable receptor of the 8-pin IC package. Once the memory 113 is inserted into the receptor unit 114, the operator may through the interface 108 instruct the test fixture 102 to burn-in or program the non-volatile memory 113 via motor controller 104 with data representative of the motor error parameters determined for the motor under test 100. After programming, the non-volatile memory package 113 may be removed from the receptor unit 114. The programmed memory package 113 now contains data of the motor error parameters unique to the motor 100 and is ready for embedding into the motor assembly 100.

Figure 4:
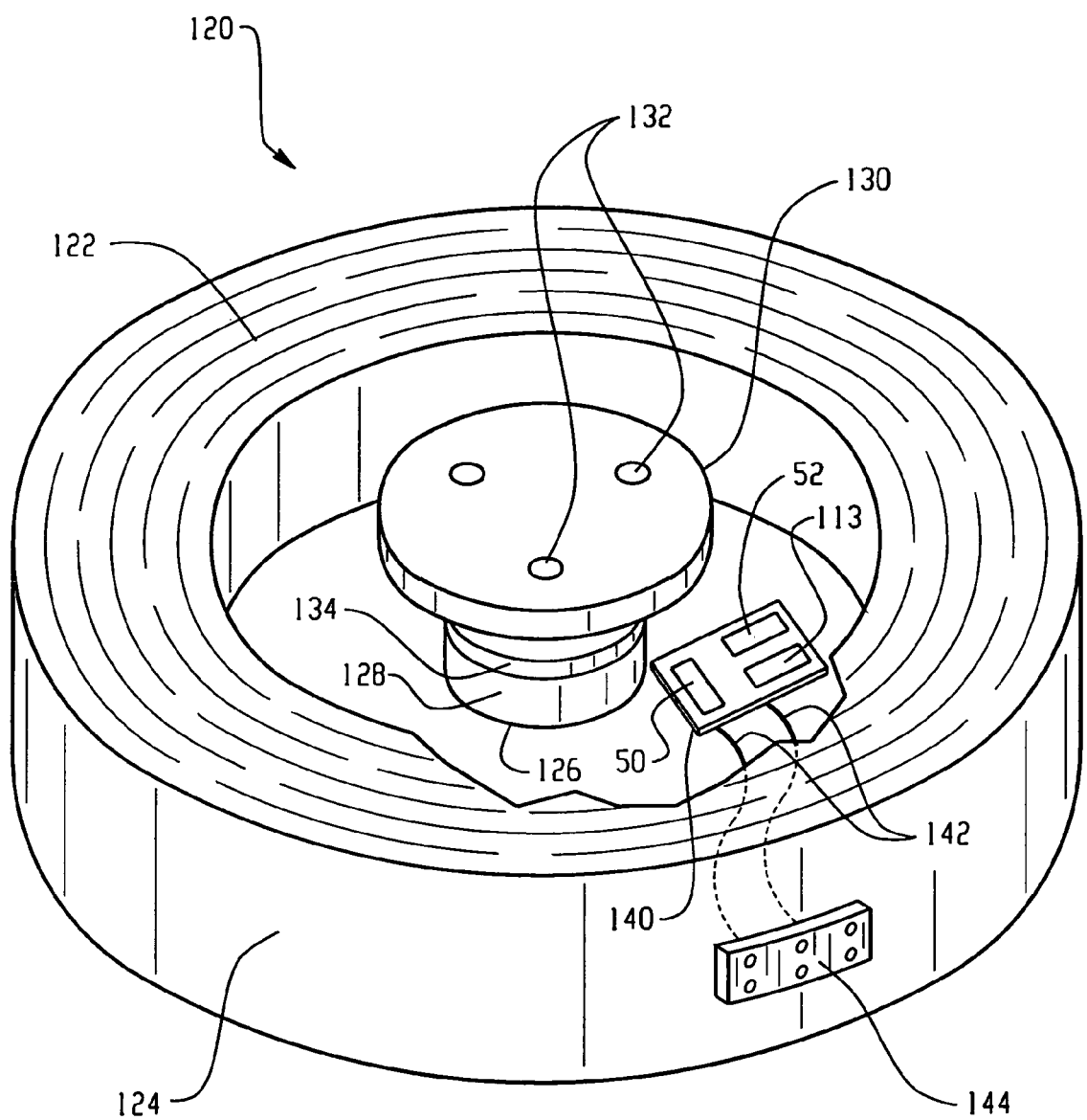
FIG. 4 is an illustration of an exemplary stator of a drive motor assembly having embedded therein motor error parameter data in accordance with another aspect of the present invention.

In the present embodiment, the wheelchair drive motor assembly includes a stator unit and a rotor unit which is driven to rotate about the stator unit. The stator unit includes the field coils of the motor along with the combination of Hall Effect sensors 50 and 52 and the rotor unit includes a multiplicity of permanent magnets distributed uniformly about the inside perimeter thereof and fits over the stator unit for rotation thereabout. An exemplary stator unit 120 is shown in the illustration of FIG. 4. Referring to FIG. 4, field coils 122 of the motor are disposed around an inside perimeter and contained within a stator housing 124 which includes a center aperture 126 for coupling to an axle 128 of the wheelchair. A hub 130 of the axle 128 protrude above the stator unit 120 and includes screw holes 132 for use in securing the rotor unit (not shown) thereto. Around the perimeter of the axle 128 below the hub 130 is disposed a ring magnet 134 magnetized with a plurality of poles in a pattern to create a magnetic field of a sinusoidal intensity, for example, during rotation thereof.

In the embodiment of FIG. 4, the Hall Effect sensors 50 and 52 are disposed on a printed circuit board 140 which is affixed to the stator unit in proximity to the ring magnet 134. The sensors are assembled on board 140 in an orthogonal orientation with respect to each other as noted herein above. The programmed EEPROM 113 containing the data representative of the motor error parameters of the motor may be also disposed on the board 140 and become a permanent part of the motor assembly. Leads connected to the sensors 50 and 52 and the EEPROM 113 are distributed through a wire cable 142 within the housing 124 to a connector 144 affixed to the outside of housing 124. Each lead of the cable is connected to a pin of the connector 144 as will become better understood from the following description.

Figure 5:
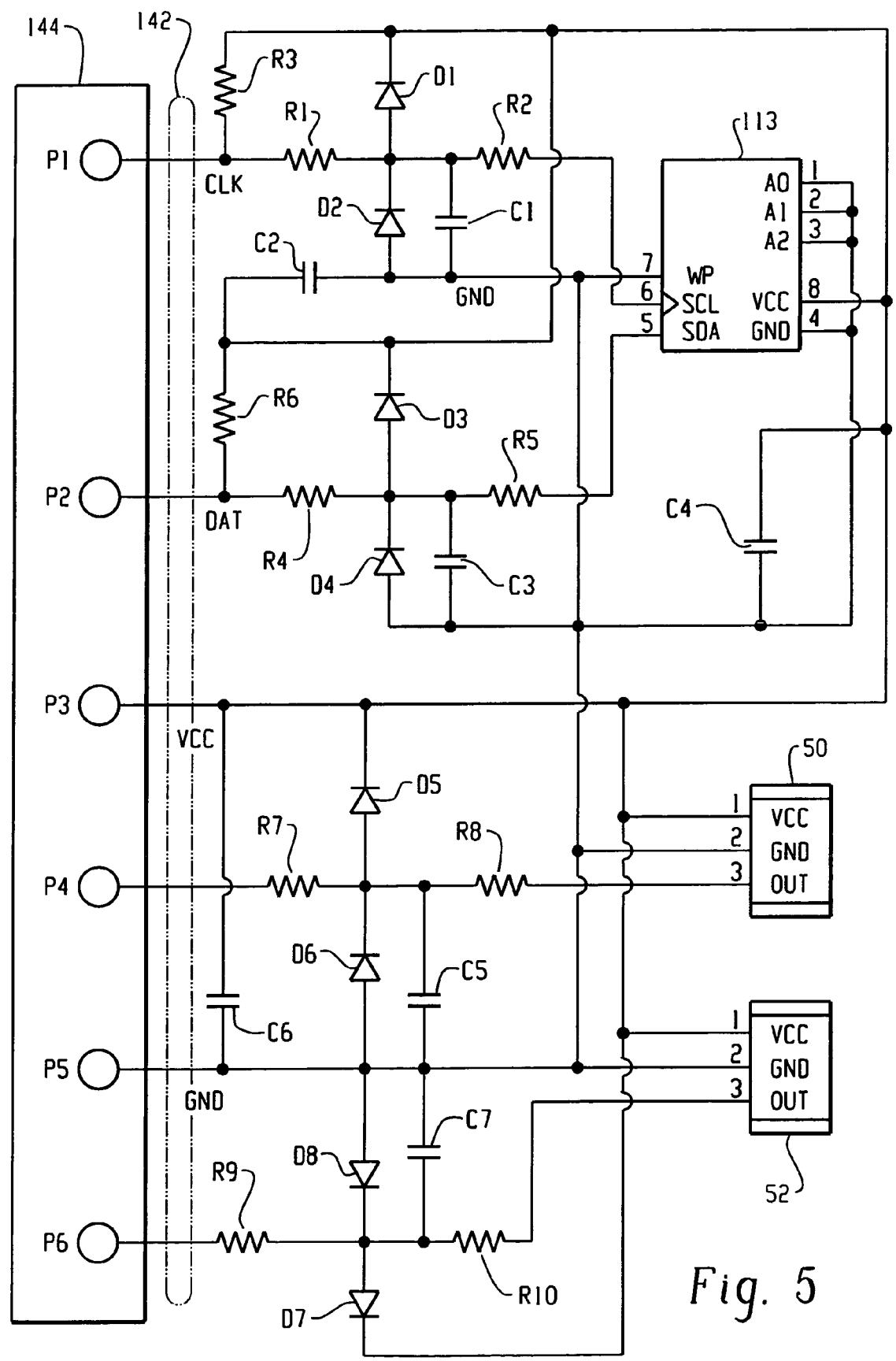
FIG. 5 is a circuit schematic of embedded circuitry of a drive motor including a memory storing the motor error parameter data thereof.

Exemplary circuitry disposed on the board 140 is depicted in the circuit schematic diagram of FIG. 5. Referring to FIG. 5, a voltage supply Vcc which may be on the order of five volts, for example, is brought to the circuit board 140 through pin P3 of connector 144 for powering the Hall Effect sensors 50 and 52, programmed non-volatile memory 113 and other circuit components. A ground return GND from the circuit components is coupled from the circuit board 140 to pin P5 of connector 144. A clock signal CLK for accessing data serially from the memory 113 is brought to the board 140 through pin P1 and coupled to the SCL input of memory chip 113 through series connected resistors R1 and R2 which may be approximately 220 ohms each, for example. At the board input, CLK is coupled to Vcc through a resistor R3 which may be approximately 10K ohms. The node connection between R1 and R2 is connected through a diode D1 (anode to cathode) to Vcc and also connected to GND through a parallel combination of a diode D2 (cathode to anode) and a capacitor C1. In the vicinity of the aforementioned circuitry, Vcc is bypassed to GND through a capacitor C2.

Serial data DAT is accessed from the SDA output of chip 113 which is connected to pin P2 through series connected resistors R4 and R5 which may be approximately 220 ohms each, for example. At the board input, DAT is coupled to Vcc through a resistor R6 which may be approximately 10K ohms. The node connection between R4 and R5 is connected through a diode D3 (anode to cathode) to Vcc and also connected to GND through a parallel combination of a diode D4 (cathode to anode) and a capacitor C3. Address inputs A0, A1 and A2 and input WP of chip 113 are coupled to GND. Also, in the vicinity of the memory chip 113, Vcc is bypassed to GND through a capacitor C4.

Still further, the output of Hall Effect sensor 50 which may be of the type manufactured by Allegro under the part no. A3515LUA, for example, is connected to pin P4 through series connected resistors R7 and R8 which may be approximately 22 ohms each, for example. The node connection between R7 and R8 is connected through a diode D5 (anode to cathode) to Vcc and also connected to GND through a parallel combination of a diode D6 (cathode to anode) and a capacitor C5. In the vicinity of the aforementioned circuitry, Vcc is bypassed to GND through a capacitor C6. Likewise, the output of Hall Effect sensor 52 which may be of the same type as sensor 50, for example, is connected to pin P6 through series connected resistors R9 and R10 which may be approximately 22 ohms each, for example. The node connection between R9 and R10 is connected through a diode D7 (anode to cathode) to Vcc and also connected to GND through a parallel combination of a diode D8 (cathode to anode) and a capacitor C7.

Figure 1:
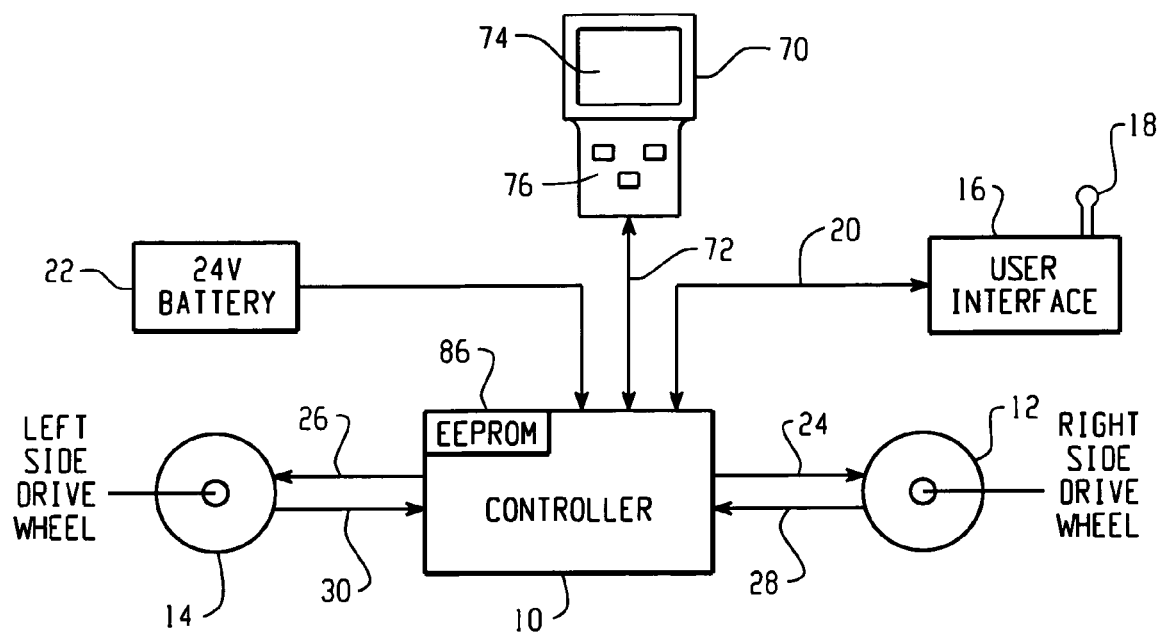
FIG. 1 is a block diagram illustration of an exemplary motor drive arrangement of a power driven wheelchair.
Figure 6:
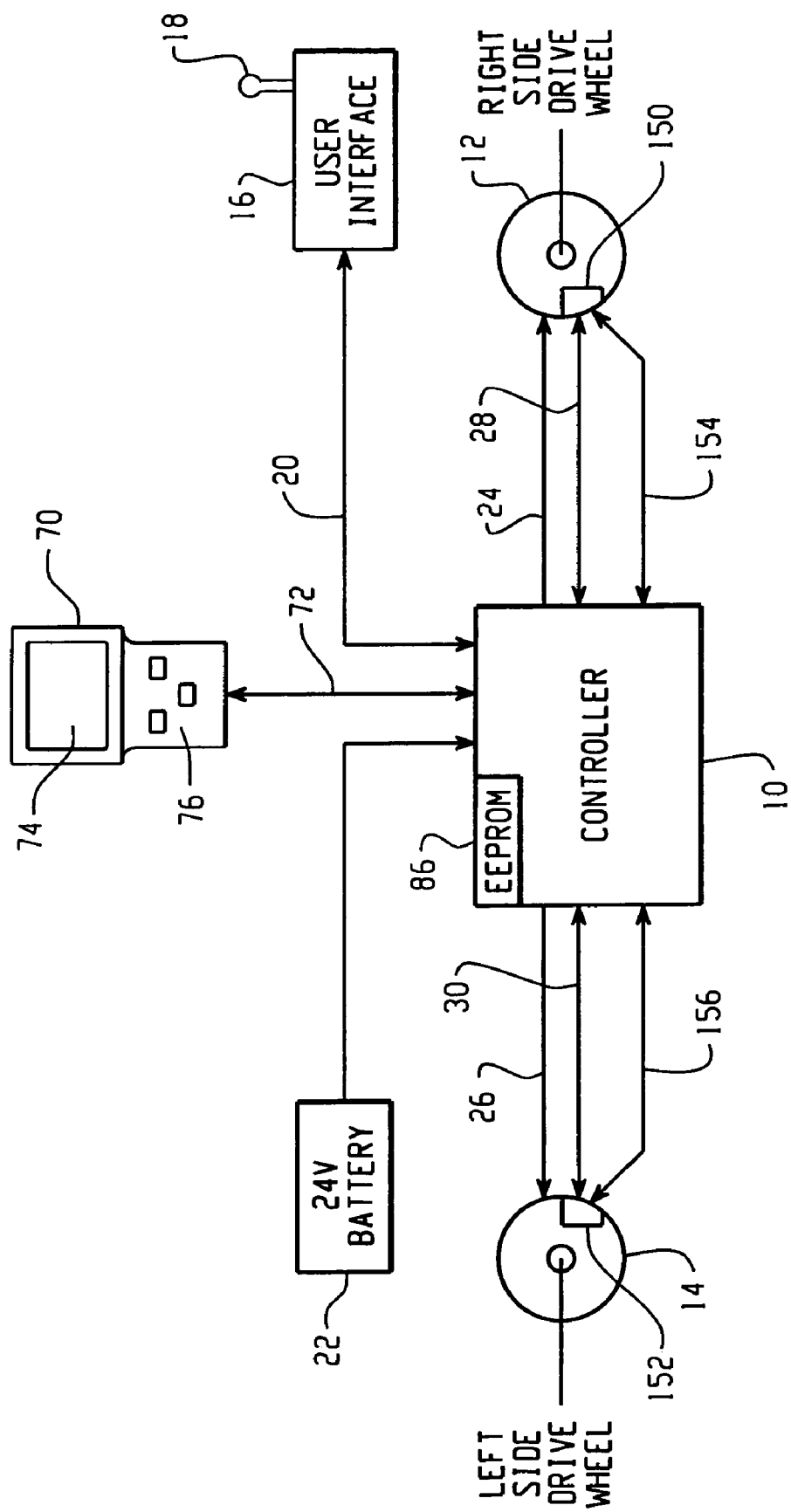
FIG. 6 is a block diagram illustration of an exemplary motor drive arrangement of a power driven wheelchair suitable for embodying yet another aspect of the present invention.

In accordance with the present invention, wheelchair drive motors may be built and distributed with the motor error parameter dataa embedded therein, like in the programmed chip 113, for example. Thus, the drive motors 12 and 14 may be assembled to the wheelchair in any conventional manner and the signal lines of the sensors 50 and 52, and the memory chip 113 may be connected to the motor controller 10 through connectors 150 for right side drive motor and 152 for left side drive motor as shown in FIG. 6. The sensors 50 and 52 may be read in from the right and left side motors over signal lines 28 and 30, respectively, as described in the embodiment of FIG. 1 and the motor error parameter data may be accessed or read from the memories of the right and left side motors over signal lines 154 and 156, respectively, for use by the motor controller 10 in controlling the motors 12 and 14.

Figure 7:
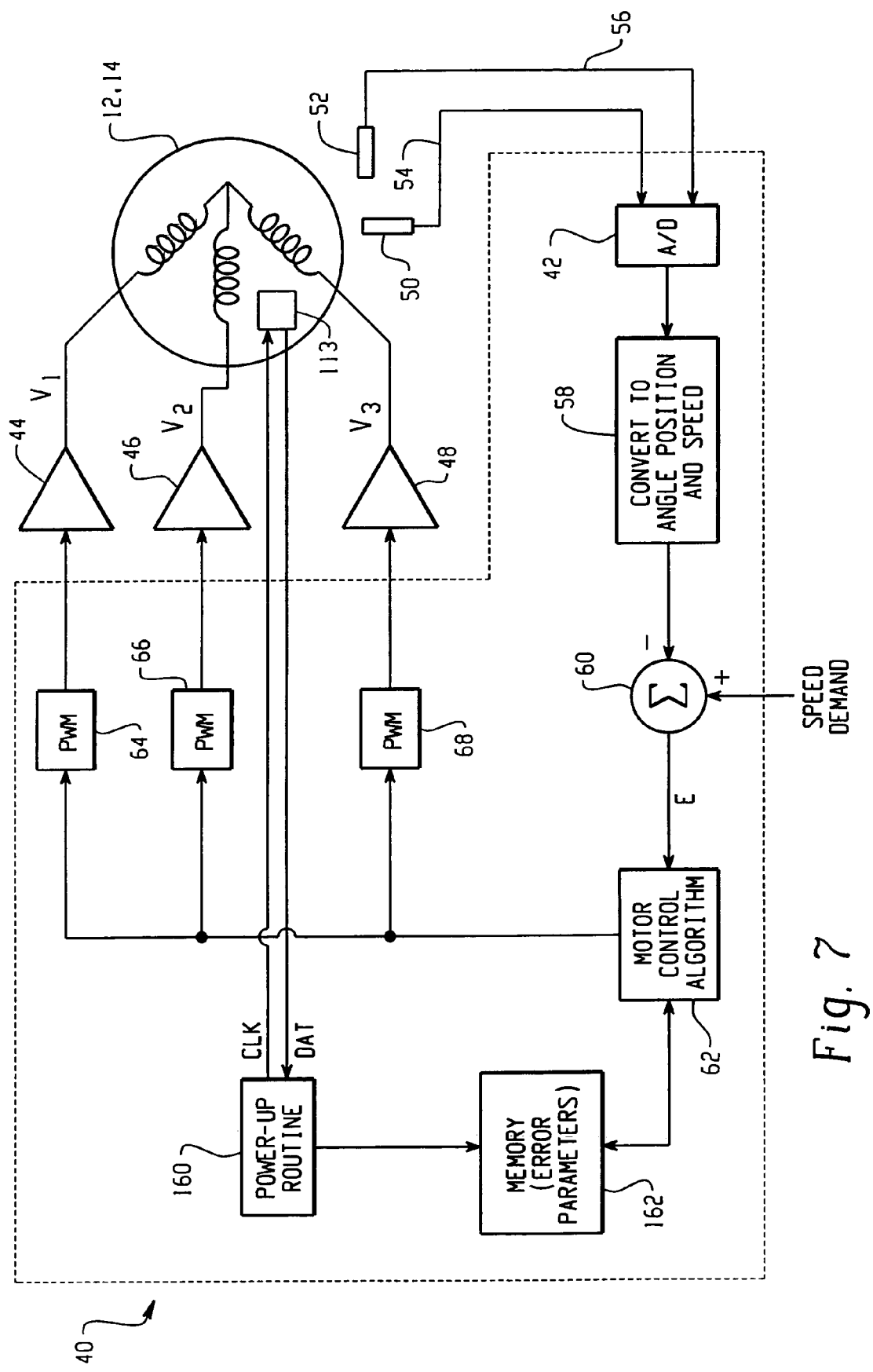
FIG. 7 is a block diagram schematic of an exemplary closed loop motor controller for controlling a drive motor of a wheelchair suitable for embodying still another aspect of the present invention.

More specifically, programmed in the microcontroller 40 of the motor controller 10 is a power-up routine 160 as shown in the functional block diagram schematic of FIG. 7. Accordingly, when the microcontroller 40 is powered up, it sequences through the programmed power-up routine 160 which includes a task of accessing or reading the motor error parameter data embedded in each drive motor connected thereto via connector 150 and lines 154 for motor 12 and connector 152 and lines 156 for motor 14 such as shown in the embodiment of FIG. 6. The power-up routine 160 may initiate the data transfer by first transmitting the clock signal CLK to one of the drive motors, like motor 12, for example, and receiving serially the error parameter data for motor 12 over the data line DAT in a predetermined data pattern. Once the routine 160 receives all of the error parameter data for motor 12, it may store the data in designated registers of a memory 162. Then, the routine 160 may access, read in and store the error parameter data of the other motor 14, for example, in the same manner.

Figure 2:
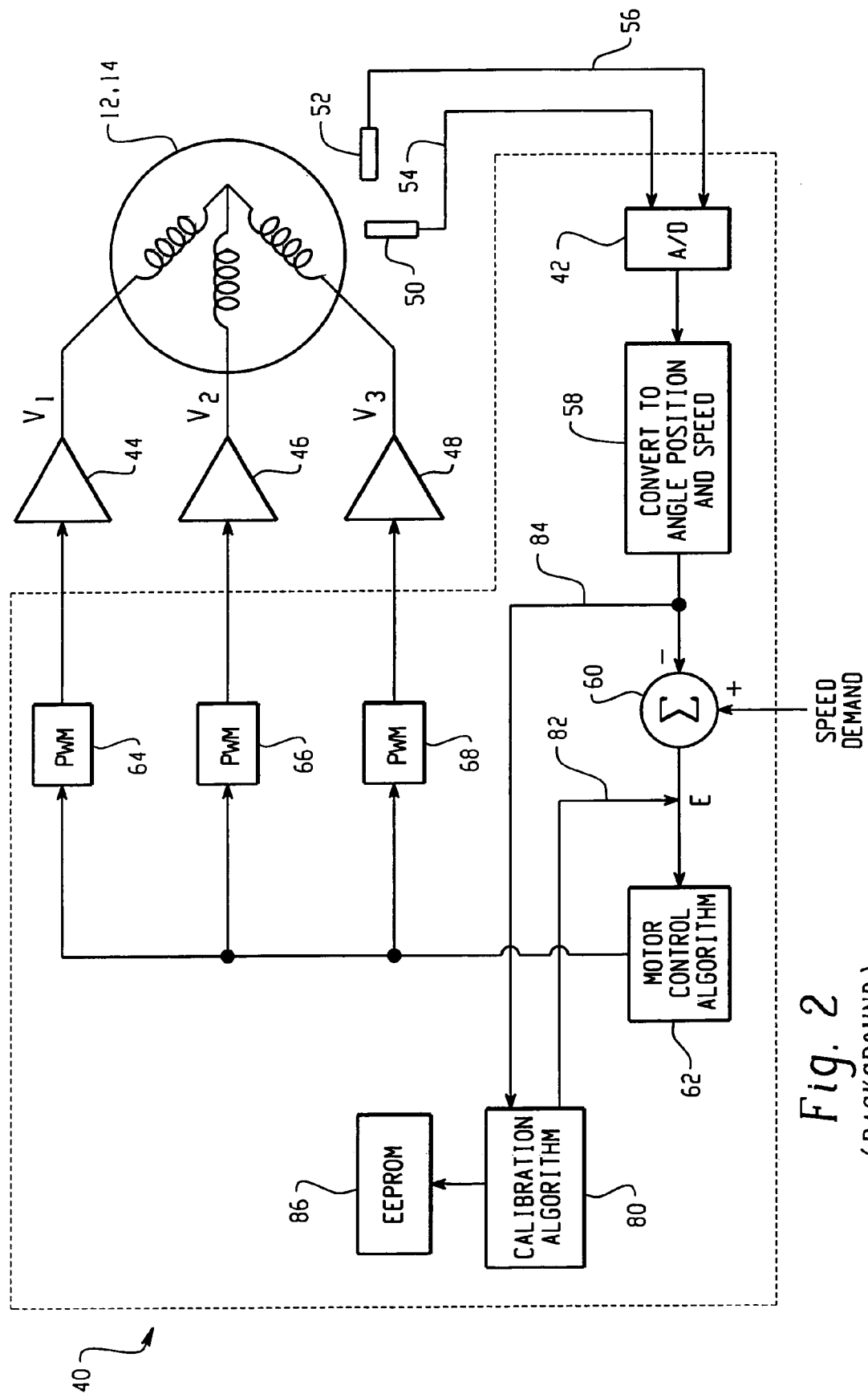
FIG. 2 is a block diagram schematic of an exemplary closed loop motor controller for controlling a drive motor of a wheelchair.

After power-up, the microcontroller 40 may be tasked with the motor control function using the motor control algorithm 62 as described herein above in connection with the embodiment of FIG. 2. During the execution of the motor control algorithm 62, error parameter data may be accessed from memory 162 by the control algorithm 62 to compensate for the motor errors in order to provide a smooth drive of the wheels of the wheelchair. Should power be disconnected from the microcontroller 40, then the power-up routine will be re-executed upon power turn on and the foregoing described steps will be repeated.

Also, should one or both of the motor assemblies of the wheelchair be replaced for any reason in the field, the replacement will be transparent to the microcontroller 40 since upon power-up, the microcontroller 40 is programmed to access and read in the error parameter data associated with the new motor(s) from the embedded programmed memory chip thereof. There is no longer any need to go through the cumbersome and time consuming calibration procedure each time a motor assembly is originally assembled to the wheelchair or replaced in the field. The calibration takes place at the motor assembly level and may be maintained throughout the lifetime of the motor.

While the present invention has been described herein above in connection with one or more embodiments, it is understood that such embodiments are being used herein by way of example with no intention of limiting the invention in any way thereby. Rather, the present invention should be construed in breadth and broad scope in accordance with the recitation of the appended claims.

What is claimed is:

1. A drive motor assembly for a power driven wheelchair comprising:
    a stator housing for containing field coils of a stator of said motor assembly;
    at least one sensor disposed in said stator housing for sensing rotation of said motor;
    a memory storing motor error parameter data including data of errors of said at least one sensor, said memory being embedded in said stator housing; and
    means for accessing said error parameter data of said memory from said stator housing.

2. The motor assembly of claim 1 wherein the stator housing includes an aperture for accommodating a wheel axle of the wheelchair; and including a ring magnet disposed about a periphery of said wheel axle at the stator housing, said ring magnet magnetized with a plurality of magnetic poles.

3. The motor assembly of claim 2 wherein the at least one sensor comprises two sensors assembled in a predetermined angular orientation with respect to each other and the ring magnet for generating signals from which an angular position of motor rotation is derived.

4. The motor assembly of claim 3 wherein the sensor signals are predetermined periodic waveforms separated in phase by 90° substantially.

5. The motor assembly of claim 3 wherein the motor error parameter data stored in said memory comprises data of at least one of the group consisting of angular error in the predetermined angular orientation between the two sensors, amplitude variation of each sensor to a magnetic field of the ring magnet, and a distortion parameter of each sensor that is related to a deviation of the corresponding sensor signal from the predetermined waveform thereof.

6. The motor assembly of claim 1 wherein the memory is a non-volatile memory.

7. The motor assembly of claim 1 including a circuit board for supporting the memory in the stator housing; a connector disposed at an outside wall of the stator housing; and signal lines for interconnecting the memory to the connector.

8. The motor assembly of claim 7 wherein the signal lines comprise a two wire serial communication with the memory.

9. The motor assembly of claim 7 wherein the signal lines include a clock line and a serial data line.

10. The motor assembly of claim 7 wherein the circuit board also supports the at least one sensor.

11. Apparatus for accessing motor error parameter data from a drive motor of a wheelchair, said apparatus comprising:
    a memory embedded in said drive motor, said memory storing motor error parameter data; and
    a programmed motor controller for controlling said drive motor, said motor controller operative to access the motor error parameter data from said embedded memory for use in controlling said drive motor.

12. The apparatus of claim 11 wherein the motor controller is programmed with a power-on program that is executable upon powering the motor controller to access the motor error parameter data from said embedded memory.

13. The apparatus of claim 12 wherein the motor controller includes a memory for storing the motor error parameter data accessed from the embedded memory of the drive motor.

14. The apparatus of claim 11 wherein the embedded memory comprises a non-volatile memory.

15. The apparatus of claim 11 wherein the motor controller is coupled to the embedded memory over a serial communications connection.

16. The apparatus of claim 15 wherein the serial communication connection comprises a clock signal and a serial data signal.

17. Method of embedding motor error parameter data in a drive motor of a wheelchair, said method comprising the steps of:
    controlling said motor through at least one predetermined drive pattern;
    sensing motor rotation during said drive pattern and generating signals representative thereof;
    deriving error parameter data of said drive motor from said generated signals;

programming a memory with said derived error parameter data; and embedding said memory in said drive motor.

18. The method of claim 17 including the step of providing access to the embedded memory in the drive motor through a communication connection.

19. The method of claim 18 wherein the access to the embedded memory is provided through a two wire serial communication connection.

20. The method of claim 17 wherein the step of programming includes programming a non-volatile memory with the derived error parameter data.

21. The method of claim 17 including the step of attaching the drive motor to a test fixture.

22. The method of claim 17 wherein the step of controlling includes controlling the motor through a plurality of predetermined drive patterns.

23. The method of claim 17 wherein the step of sensing includes sensing the angular position of the motor during the drive pattern and generating signals representative of said motor angular positions.

* * * * *

UNITED STATES PATENT AND TRADEMARK OFFICE
CERTIFICATE OF CORRECTION

Page 1 of 1

PATENT NO.      : 6,989,642 B2
APPLICATION NO. : 10/686840
DATED           : January 24, 2006
INVENTOR(S)     : Theodore D. Wakefield, II et al.

It is certified that error appears in the above-identified patent and that said Letters Patent is hereby corrected as shown below:

On the Title page of the patent in the FOREIGN PATENT DOCUMENTS section, please change the following:

"EP 1093219 A2" should read --EP 1093210 A2--.
"EP 1178498 A2" should read --EP 1178598 A2--.

Signed and Sealed this
Fourth Day of December, 2012

David J. Kappos
*Director of the United States Patent and Trademark Office*